(12) United States Patent
Nathan et al.

(10) Patent No.: US 10,796,342 B1
(45) Date of Patent: Oct. 6, 2020

(54) METHOD AND SYSTEM FOR UNIFIED HUMAN CAPITAL MANAGEMENT

(75) Inventors: Sheldon Nathan, San Carlos, CA (US); Vijayendra Singh, Palo Alto, CA (US)

(73) Assignee: SABA SOFTWARE, INC, Dublin, CA (US)

( * ) Notice: Subject to any disclaimer, the term of this patent is extended or adjusted under 35 U.S.C. 154(b) by 0 days.

(21) Appl. No.: 12/542,601

(22) Filed: Aug. 17, 2009

Related U.S. Application Data

(60) Provisional application No. 61/089,827, filed on Aug. 18, 2008, provisional application No. 61/092,712, filed on Aug. 28, 2008.

(51) Int. Cl.
*G06Q 30/02* (2012.01)
*G06Q 10/06* (2012.01)

(52) U.S. Cl.
CPC ... *G06Q 30/0276* (2013.01); *G06Q 10/06398* (2013.01)

(58) Field of Classification Search
CPC ..... G06Q 10/063114; G06Q 10/06398; G06Q 10/0639
USPC ................................ 705/1–44; 434/236, 362
See application file for complete search history.

(56) References Cited

U.S. PATENT DOCUMENTS

| | | | | |
|---|---|---|---|---|
| 5,596,698 A | * | 1/1997 | Morgan | G06F 3/04883 382/186 |
| 5,823,781 A | * | 10/1998 | Hitchcock | G09B 19/0053 434/118 |
| 5,934,909 A | * | 8/1999 | Ho et al. | 434/362 |
| 6,652,287 B1 | * | 11/2003 | Strub | G09B 5/00 434/322 |
| 9,665,529 B1 | * | 5/2017 | Lattyak | G06F 40/169 |
| 2002/0103882 A1 | * | 8/2002 | Johnston | H04L 67/36 709/218 |
| 2004/0202988 A1 | * | 10/2004 | Evans et al. | 434/236 |
| 2005/0015291 A1 | * | 1/2005 | O'Connor | G06Q 10/10 434/219 |
| 2005/0227216 A1 | * | 10/2005 | Gupta | G06Q 50/205 434/322 |
| 2006/0121435 A1 | * | 6/2006 | Chen | G09B 7/00 434/362 |
| 2006/0242004 A1 | * | 10/2006 | Yaskin et al. | 705/11 |

(Continued)

OTHER PUBLICATIONS

Smith et al., Recruiting, Retaining, and Advancing Careers for Employees From Underrepresented Groups, 2008, JONA: The Journal of Nursing Administration, vol. 38—Issue 4, all pages (Year: 2008).*

(Continued)

*Primary Examiner* — Hafiz A Kassim
*Assistant Examiner* — Zahra Elkassabgi

(57) ABSTRACT

A system of human capital management is provided for implementing a plurality of integrated interfaces for the creation, management, delegation, tracking and monitoring of development plans for one or more individuals. A method is also provided for managing human capital by managing the developmental needs of an individual. This novel method includes defining a plurality of developmental needs (e.g., goals, conditions and tasks) to be achieved or completed by an individual, consolidating the developmental needs into a development plan specific to the user and tracking the progress of the individual with respect to the development plan in a single integrated application.

23 Claims, 7 Drawing Sheets

(56) References Cited

U.S. PATENT DOCUMENTS

2006/0252015 A1* 11/2006 Figueroa .................. G09B 7/02
                                                          434/236
2009/0049077 A1*  2/2009 Lawlor ............... G06F 16/4393
2009/0138341 A1*  5/2009 Mohan et al. ................... 705/11
2010/0021871 A1*  1/2010 Layng ...................... G09B 7/02
                                                          434/178

OTHER PUBLICATIONS

U.S. Appl. No. 12/548,356, filed Aug. 26, 2009, by Sheldon Nathan et al., "Method and System for Integrated Human Capital Platform".

* cited by examiner

METHOD AND SYSTEM FOR UNIFIED HUMAN CAPITAL MANAGEMENT

CLAIM OF PRIORITY

This applications claims priority from U.S. provisional patent application 61/089,827 filed Aug. 18, 2008 and U.S. provisional patent application 61/092,712, filed Aug. 28, 2008.

BACKGROUND

Human capital refers to the collection of skills and knowledge embodied in the ability to perform labor to produce economic value, and encompasses the skills and knowledge gained by an employee through education and experience. The efficacy and importance of effective human capital management has increased dramatically in recent years, due in large part to the continued development and deployment of modern technology and the corresponding demand in the advanced skills and expertise required to utilize these advances in the most efficient, cost-effective manner. For example, individuals in technologically savvy industries continuously develop new skills which correspond to advances in their respective industries to maintain a competitive level of effectiveness. Likewise, businesses and organizations must be able to effectively manage human capital, e.g., by continually monitoring the progress and development of their employees in order to remain competitive and profitable.

The developmental needs of an individual within an organization can stem from a variety of sources: organizational objectives and requirements; management-specified targets or goal-setting; requirements imposed by jobs; roles; processes; products; and other dimensions that are relevant to the user, corporate compliance and process requirements, as well as personal aspirations. These developmental needs may include, for example: goals that need to be achieved; tasks that need to be completed; learning and compliance objectives that need to be met; and competencies that need to be acquired, each to a relevant degree of completion and/or proficiency. Furthermore, industries with constantly developing standards may require continuous, additional education. The sheer amount of developmental needs that an individual may be interested in fulfilling may make self-tracking difficult. Naturally, monitoring the developmental goals and progresses of several individuals may be exceedingly complicated for managers and supervisors without a homogenized or easily-accessible tracking resource.

Traditionally, organizations track these needs in a mix of disparate, non-standard, non-dedicated and unspecialized applications or homegrown systems, often supplementing (or replacing entirely) the tracking with paper-based processes. Perhaps the oldest and simplest goal-planning system is the simple commitment of a developmental need or goal on a writing surface, such as a piece of paper, chalkboard, or plastic white board. Another example of a traditional goal-planning system involves the incorporation of popular office software (e.g., presentation or word-processing software applications). In a typical scenario, an employee may set his or her goals on a presentation slide for presentation during a team or executive meeting. Physical copies may be distributed to the other members of the meeting, or copies implemented as computer files may be electronically distributed.

However, a modification to a plan or goal may be decided after the meeting and/or distribution. Unfortunately, as most homegrown systems do not include repositories where the file can be accessed and shared between multiple devices, the modification may not be replicated for and propagated to every member to view. Certainly, earlier physical copies would also not reflect the modification. Thus, where a modification is unilaterally decided, the modifications to the plan may go unnoticed by one or more parties and result in miscommunication and a failure to meet established goals. Accordingly, to provide notice to the other group or team members, the modifying user would have to distribute new versions of the physical and/or electronic copy to reflect changes. Likewise, when modifications from multiple sources are made either concurrently or within a relatively short period of time, confusion as to which version is the actual or "master" version may arise between group members.

Moreover, tracking the progress of the employee or teammate during a developmental period may suffer from the same potential flaws as modification, and additionally require access to sensitive or confidential material (e.g., the user's academic progress in a class or at an institution) or may even be impossible for any third party to confirm with any kind of certifiable accuracy. Also, physically charting a user's progress may prove difficult. For instance, to extend the previous example, in order to update a specific user's progress, a manager or teammate may require access to the presentation slides, and permission to modify (update) the specific employee's developmental progress.

A more contemporary method is to use specialized software suites to track one or more of the developmental needs simultaneously, wherein each developmental need may be set and/or tracked in a single application, or module. Unfortunately, these systems often suffer from a variety of significant flaws. One common flaw is that a developmental need may be set as a goal in one application (or module) yet tracked on a separate (though related) application (or module), thereby adding unnecessary and possibly redundant actions. Another common flaw includes offering only one area to view an individual's goals in one application (or module) and another area in the same application or related application or module to view necessary classes and curricula, etc. These sets of flaws increase both the complexity of designing as well as monitoring the progress of a developmental program. Further flaws may consist of a limited scope in tracking progress and an inability to provide approval-functionality. Each of these flaws can contribute significantly to an adverse effect on a user experience for the management of human capital.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to a system of human capital management and operating methods thereof. Specifically, what is designed is a unified system of human capital management implementing a plurality of integrated interfaces for the creation, management, delegation, tracking and monitoring of development plans for one or more individuals.

In one embodiment, a method is provided for managing human capital by managing the developmental needs of an individual. This novel method includes defining a plurality of developmental needs (e.g., goals, conditions and tasks) to be achieved or completed by an individual, consolidating the developmental needs into a development plan specific to the user and tracking the progress of the individual with respect to the development plan in a single integrated application. Further embodiments include monitoring, by a second individual (e.g., an authorized teammate or work-supervisor), the progress of the individual with respect to completing the development plan.

In another embodiment, a method is described for managing human capital by managing development plans for a plurality of individuals. This novel method includes creating a plurality of development plans to fit a plurality of individuals or roles, each development plan comprising a plurality of activities or conditional requirements to be performed by an applicable individual; assigning one or more of the development plans to one or more individuals or roles; setting target dates corresponding to the activities or conditional requirements of a development plan; and monitoring the progress of the one or more development plans assigned to one or more individuals.

In a still further embodiment, a unified human management system executed by a processing device is provided, the system including a first interface for creating a development plan for one or more individuals; a second interface for assigning a plurality of conditional requirements from a set of pre-defined conditional requirements to a development plan; and a third interface for tracking an individual's progress of a conditional requirement in a corresponding development plan.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
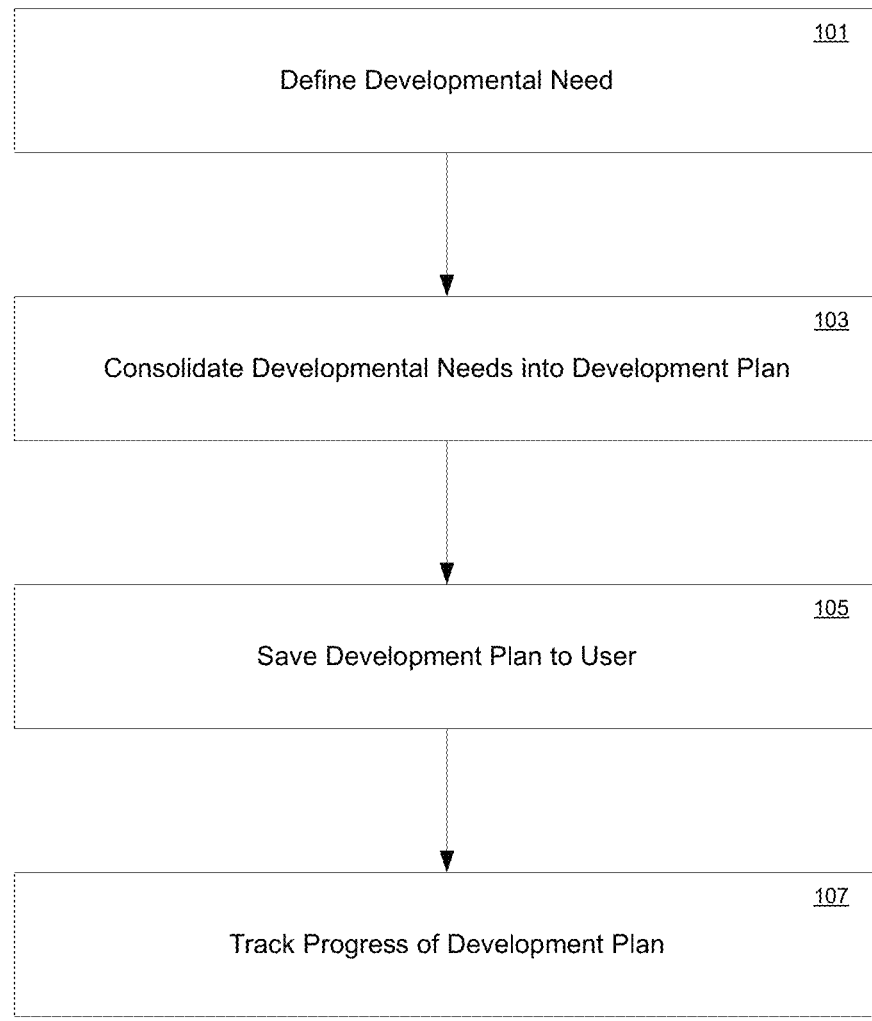
FIG. 1 depicts a flowchart of an exemplary method for managing, in an integrated human capital management system, the developmental needs for an individual, in accordance with various embodiments.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follows are presented and discussed in terms of a process. Although steps and sequencing thereof are disclosed in figures herein (e.g., FIGS. 1 and 2) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following embodiments, an approach is described for unified human capital management in an integrated application. In one embodiment, a method for managing the developmental needs of an individual is provided. In another embodiment, one or more development plans of one or more individuals are managed by an overseer or manager. In a still further embodiment, development plans comprising a plurality of conditional requirements are managed in a single integrated application.

Individual Human Capital Management

In a typical human management system, an individual may have one or more self-assigned or delegated developmental needs. For example, these needs may include: personal or business goals that need to be achieved (e.g., quit smoking, sell X amount of product Y); tasks that need to be completed (e.g., draft business proposal, finish construction of structure); learning and compliance objectives that need to be met (e.g., correct for code violations, learn a new language); and competencies that need to be acquired (e.g., certification for a discipline or skill), each to a relevant degree of completion and/or proficiency. These developmental needs can stem from a variety of sources—organizational objectives and requirements; management-specified targets or goal-setting; requirements imposed by jobs, roles, processes, products that are relevant to the user; corporate compliance and process requirements, as well as personal aspirations.

With reference to FIG. 1, a flowchart is depicted of an exemplary process 100 for managing, in an integrated human capital management system, the developmental needs of an individual. Steps 101-107 describe exemplary steps of method 100 in accordance with the various embodiments herein described.

At step 101, one or more developmental needs are defined in an integrated human capital management system based on user-input. Each developmental need may be defined on an ad hoc basis, or selected from a pre-defined knowledge base or bank of developmental needs which may, in some embodiments, be further adjusted to be customized for a specific first user. In further embodiments, defining a developmental need may include specifying the condition which must be achieved in order to satisfy the developmental need according to a standard. For example, a developmental need may be defined from a user selection of one or more of a pre-generated list of conditions. Alternatively, a new developmental need may be added in the integrated human capital management system from user input. In still further embodiments, defining a developmental need may also include setting a target date for the condition to be achieved or completed to satisfy the developmental need and assigning an importance of the developmental need (e.g., a priority relative to other developmental needs) based on user input or default values.

In some embodiments, the developmental needs may be defined in a first graphical interface of the integrated human capital management system. In still further embodiments, the first graphical interface may include one or more fields which may further be implemented as, but is not limited to, for example, a combination of one or more user-selection fields (e.g., drop down menu with selectable entries), toggle-fields (e.g., check boxes) and free-entry text fields. Thus, a developmental need may be defined for an individual by the collection and processing of user input in the one or more user-selection fields and free-entry text fields. According to some embodiments, the developmental need may be saved (e.g., stored in a memory inherent to, or accessible by the system) to correspond to the individual. For example, an individual may be represented as a user or entity within the unified human management system, wherein the developmental need may be stored and/or associated with one or more representations of the individual within the system. (e.g., a user profile of the individual).

At step 103, the one or more developmental needs defined in step 101 are consolidated into a development plan. In one embodiment, the development plan may be customized for a specific individual. In alternate embodiments, the development plan may be saved as a development plan template in a storage base of pre-defined development plans. According to one embodiment, a development plan may be implemented in the integrated human capital management application as an interface displaying a template of one or more developmental needs which may be subsequently modified to be customized for a user or object in the system. In further embodiments, a user can interface with a local instance of a plurality of communicatively coupled instances of the human capital management application. In such embodiments, some or all of the pre-defined data, e.g., pre-defined developmental needs or pre-defined development plans, may be stored on a remote instance of the human capital management application, and accessed and referenced by a user within the local instance of the application.

At step 105, the development plan consolidated in step 103 is assigned to an individual. In one embodiment, the development plan may be assigned to an individual through user input received in the integrated human capital management application. For example, the development plan may be assigned to the representation of the individual in the application (e.g., the individual's user account or profile). In one embodiment, a development plan is consolidated ad hoc in step 103 and subsequently assigned to an individual. In still further embodiments, a pre-defined development plan may be referenced from a knowledge base of development plans and modified to be customized for the specific individual and subsequently saved and/or associated with the individual.

Finally, at step 107, the progress of the corresponding individual in executing the development plan assigned in step 105 is tracked. Tracking the progress of the development plan may include, for example, tracking the progress of the individual developmental goals comprising the plan. Tracking may be performed by updating the current status of the performance of one or more of the individual goals. For example, when a developmental goal is completed, the user may update the plan to reflect the status accordingly. This status may be thus consolidated with the progress of other developmental goals in the integrated human capital management system and reflected in a graphical user interface. In one embodiment, the status is reflected in a display and configurable via one or more interface fields. In further embodiments, the interface fields may be toggle-able via (s)election. In alternate embodiments, the status of the plan may be updated on the display through user input in a text box.

According to some embodiments, a development plan pre-customized for an individual may be modified to update one or more developmental needs comprised in the development plan from user input received in an interface of the integrated human capital management system. For example, additional developmental needs may be added to a development plan for an individual. Alternatively, a development plan may be modified to remove one or more developmental needs. In a further embodiment, modifications to a development plan template are automatically saved and subsequently associated with the individual (e.g., the individual's user profile in the system) that the development plan is being customized for.

In still further embodiments, a 3$^{rd}$ party (e.g., a second user in an integrated human capital management system) may be granted access to submit user input used by the integrated human capital management system to perform some or all of the steps in the method 100 for another individual (e.g., the first user in the human capital management system). For example, a second user may be granted access to providing user input used in the system to define one or more developmental needs to be customized for the first user, as described with reference to step 101. The second user may also be granted access to submit user input and initiate the consolidation of one or more defined developmental needs into a development plan associated with the first user, as described above with reference to step 103.

The second user may subsequently submit input to initiate the assignation (e.g., correlation with the first user within a unified human capital management system) of the customized development plan consolidated from the developmental needs customized to the first user. Alternatively, user input from the second user may be used to assign a pre-defined development plan to the first user. Additionally, the second user may be granted access to and allowed to view the progress of the first user in completing the assigned development plan through a display interface in the unified human capital management system.

In some embodiments, one or more of these abilities may be restricted within the system to individuals with access to the first user's account, or portion of the account (e.g., a user profile or plan profile representing, and associated with the first user). For example, only individuals with specified identities or with the first user's account authorization information (e.g., user-id and password) may be granted access to submit input used by the integrated human capital management system to perform one or more of the process steps of method 100. In further embodiments, the performance of one or more of the abilities may be restricted to one or more thresholds of authorization, wherein only users having an authorization level matching or exceeding the threshold of an ability (e.g., defining developmental needs, consolidating a development plan, modifying a development plan, assigning a development plan and monitoring a development plan) are capable of submitting input used to perform the ability on a particular user.

For example, each user may have an authorization level corresponding to the other users of the system. The authorization level may be assigned automatically (e.g., a default authorization level), or assigned via input received from an administrator or other users with appropriate levels of authorization. Users having the requisite level of authorization to access a specific user's plan profile may be capable of submitting input to initiate the performance of the abilities requiring authorization levels of equal or lesser value than the accessing user in the system. For example, identified teammates of a first user may be granted the authorization to be able to monitor (e.g., view the tracked progress of) a shared development plan with the first user but may not be able to submit input to add or remove developmental needs to a development plan. Likewise, an identified manager or supervisor of a first user in the system may be capable of submitting input for the system to perform both adding and removing developmental needs to a development plan for the first user as well as monitoring the progress of the first user with respect to completing the performance of a development plan.

Collective Human Capital Management

According to common human capital management systems, a manager or administrator of a business or organization may be tasked with managing the development plans of one or more employees or individuals. In one embodiment, the management of the development plans of the one or more employees or individuals is performed in a unified human management system. In further embodiments, the unified human management system may be implemented as a plurality of remotely distributed instances of a single application. According to these and other embodiments, each instance of the application may be communicatively coupled to one or more other instances in a network (e.g., the instances in a business or organization may be communicatively with each other).

In still further embodiments, a repository may be maintained at a remote location within the network, wherein the repository may be configured to be accessible to each instance. In some embodiments, the repository may be used as a shared resource (e.g., a database) for the storage of data related to human management which may include, for example, user profiles, development plans and/or conditional requirements as described below. In further embodiments, the repository may provide functionality common to typical repositories, such as merging and reversion functionality as well as revision history.

Figure 2:
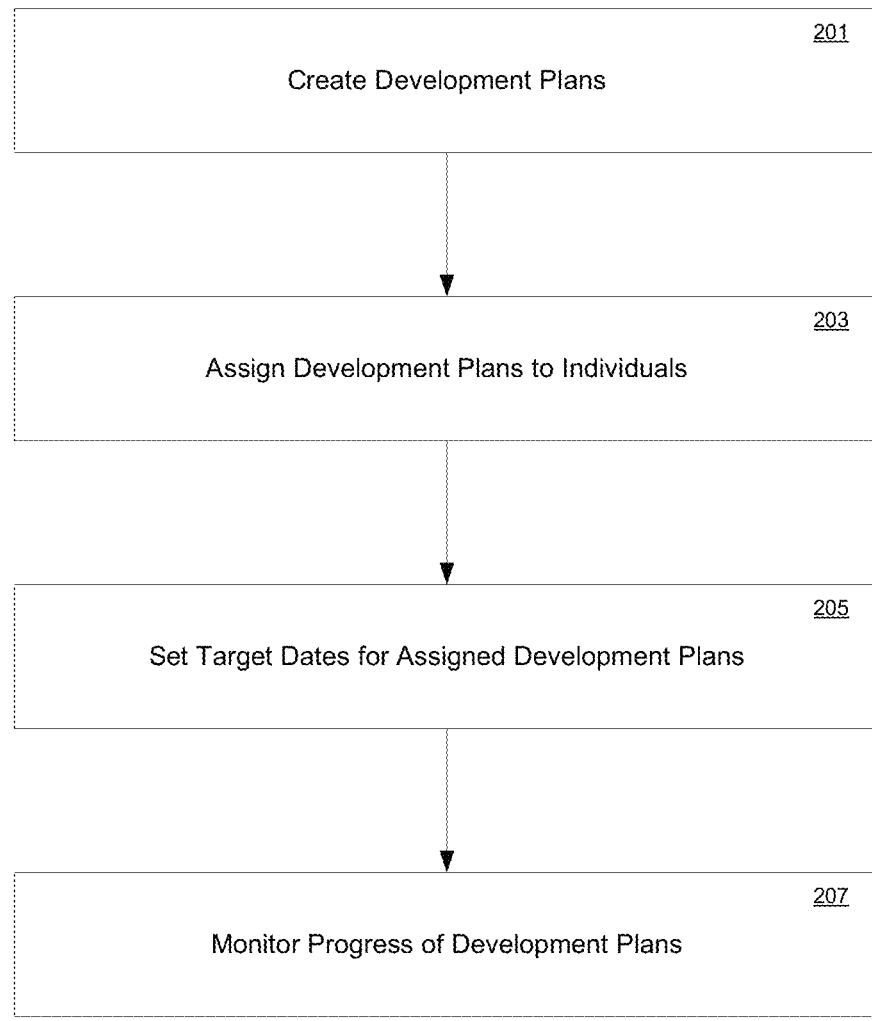
FIG. 2 depicts a flowchart of an exemplary method of managing development plans for a plurality of individuals in an integrated human capital management system, in accordance with various embodiments.

With reference now to FIG. 2, a flowchart of an exemplary process 200 for managing the development plans for a plurality of individuals in an integrated human capital management system is depicted. Steps 201-207 describe exemplary steps of method 200 in accordance with the various embodiments herein described.

At step 201, one or more development plans are created by the unified human capital management system based on user input. The development plan may, for example, be created specifically for a targeted individual or corresponding generally to a position or role in a business or organization. In one embodiment, each development plan includes at least one conditional requirement to be achieved by the targeted individual, or the employees or individuals occupying the position or role in an organization, respectively. According to some embodiments, each of the conditional requirements may correspond to a developmental need, as discussed above with reference to FIG. 1, and, as such, may be defined on an ad hoc basis, or selected from a pre-defined knowledge base or bank of conditional requirements. For example, a user may be able to submit input used to add a conditional requirement to a development plan by initiating a process to create a new conditional requirement for the development plan (e.g., via a development plan interface) or add a conditional requirement to the development plan from a pool of pre-defined conditional requirements (also via, for example, the development plan interface).

At step 203, the one or more development plans created in step 201 are assigned to one or more entities in the unified human capital management system. Entities may, include for example (but are not limited to), an individual, role, or position in a business or organization. In one embodiment, assigning a development plan to an entity is performed in the integrated human capital management system by creating a persistent association between a specific development plan (or an instance of a development plan template) with the representation(s) of the entity in the system. For example, in one embodiment, a target entity, such as an individual, may be represented by an exclusive account in the human capital management system which corresponds to one or more interfaces (e.g., a user profile).

According to such an embodiment, a development plan, as created in step 201, may be assigned to the individual such that the development plan is accessible from the user's profile (or other interface) and represents the development plan and corresponding conditional requirements which have been assigned to the individual to complete. In further embodiments, the assignment may be performed via one or more assignment interfaces based on user election within input fields displayed on the assignment interfaces. In still further embodiments, the assignment may be performed based on user input received from an identified managing user for another target user of the system through an interface corresponding to the account (or other representation) of the first user. Thus, a managing user (e.g., a manager, team lead, or other user with authorization) may be able to submit input used by the system to assign, even remotely, one or more development plans for another target entity.

According to some embodiments, the unified human capital management system receives user input from a managing user and, based on the input, assigns a development plan to a class of entities, such as a position or role. In further embodiments, subsequent individuals identified by the system as belonging to the class of entities may be automatically assigned the development plan by the system. In alternate embodiments, user input from the managing user is also used by the system to apply, as a template, the development plan assigned to the class of a target user, and further modify the development plan to be customized for the target user.

At step 205, one or more target dates are set for the one or more development plans created in step 201. According to one embodiment, each target date corresponds to a separate conditional requirement in the one or more development plans. In further embodiments, each target date corresponds to the combination of a conditional requirement and a target user of the system. Thus, for example, a target date may be set for a conditional requirement in a development plan assigned to a target user which is the date specified by the managing user for the target user to complete performance of the conditional requirement. Setting a target date may be performed by the system by collecting a user input in a user-selection field or other such graphical user interface from one or more authorized users of the system.

Finally, at step 207, the progress of one or more target users in executing one or more development plans assigned in step 203 is monitored by the system. In one embodiment, an identified managing user may be granted access to view the progress of the one or more target users in a display. Granting access to monitor the progress of the one or more target users corresponding to the one or more development plans may include, for example, allowing the managing user the ability to view the progress of the target users in completing the individual conditional requirements comprising the one or more development plans assigned to the target user by the target date set in step 205. In one embodiment, granting access to monitor the progress includes allowing a managing user the ability to view the current status of a specific conditional requirement as updated by the target user.

In one embodiment, the current status is reflected in a display and configurable via one or more interface fields by the target user, the managing user or other authorized users. In further embodiments, a managing user may be granted access to each target user's plan interface to view and monitor the target user's progress. In further embodiments, a managing user may be granted the ability to monitor the progress of more than one target user on a single display or interface.

According to some embodiments, a development plan may be modified by the unified human capital management system via user input received from a managing user after creation. For example, a development plan assigned to an individual may be modified to update one or more conditional requirements comprised in the development plan to include the current progress of the individual. Additional conditional requirements may be added or removed to a development plan for an entity. For example, a conditional requirement which has been achieved by the target user may be removed from the development plan of the target user.

Alternatively, a development plan which has been fully achieved (e.g., each conditional requirement comprising the development plan has been completed) may be de-assigned to the target user's representation in the system, or otherwise visibly distinguished from pending, as-of-yet uncompleted development plans. In still further embodiments, one or more development plans may be combined to form a compound development plan. Alternatively, one development plan may be created to include other development plans as one or more sub-development plans, each with its own set of conditional requirements to fulfill.

Exemplary Individual Management Interface

Figure 3:
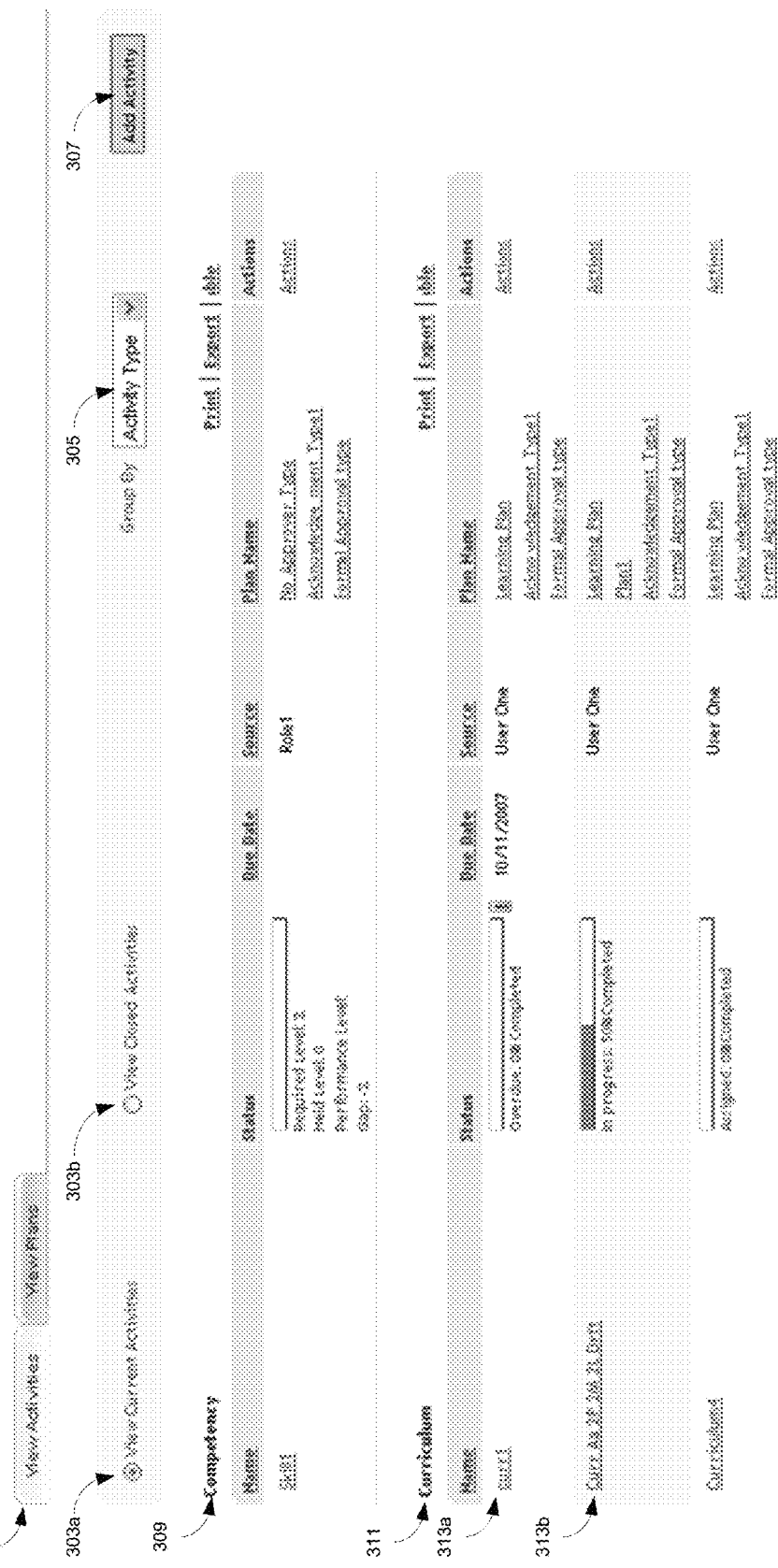
FIG. 3 depicts a graphical representation of an exemplary on-screen interface for managing a plurality of development plans for an individual, in accordance with various embodiments.

With reference now to FIG. 3, an on-screen graphical representation of an exemplary interface 300 for managing a plurality of development plans for an individual is depicted, in accordance with various embodiments. In a typical configuration, graphical user interface 300 depicts the interface 300 corresponding to an individual's plans and the activities comprising the individual's plans in an integrated human management system.

In one embodiment, interface 300 includes a plurality of panes (e.g., panes 301) allowing the user to alternate the display of corresponding activities according to the type of activities assigned or arranged according to the plurality of plans comprising the activities. In a further embodiment, the display of the activities may be limited to view currently pending (that is, open) activities. Alternatively, the display of the activities may be limited to a view of closed activities (e.g., completed activities). The display may be toggled between open and closed activities by, for example, user actuation of a corresponding toggle (e.g., 303*a*, 303*b*). In still further embodiments, an activity may be added via the interface 300 by actuating on an add activity component (e.g., add activity button 307). User actuation of the add activity component may generate a new display or separate interface to specify the specific parameters comprising a new activity. The activity may then be added to a plan for the user. In some embodiments, the added activity may also be added to a plan for another user in the system.

The arrangement of the activities may be modified through group display component 305. In one embodiment, group display component 305 is implemented as a drop down menu that lists the available displays. As presented, FIG. 3 displays the activities arranged according to the type of activity. The types of activities in FIG. 3 include activities corresponding to a Competency (e.g., Competency Field 309) and Curriculum, (e.g., Curriculum Field 311). Accordingly, the activities depicted in interface 300 of FIG. 3 may correspond (generally) to either a competency or a particular curriculum. In one embodiment, correspondence to a type of activity may be specified in the interface 300 by the user. In alternate embodiments, the type of activity may be specified in an alternate interface (e.g., interface 400 described below) and assigned to the user's interface 300.

In one embodiment, activities corresponding to a particular type of activity (e.g., activity 313*a*, 313*b*) may be further arranged within the corresponding type according to a specified order. For example, the activities may be arranged alphabetically according to activity name. In other embodiments, the activities may be arranged chronologically, according to assignment date or due date (e.g., date to be performed by). The activities may further be displayed irrespective of type via user selection of the group component 305 described above. As depicted, a display of an activity may include the name of the activity or task, the user's most recent status (in terms of completion) of the particular activity or task; the due date of the task; the source (e.g., the assignor of the task); and the plan affiliated with the activity. According to further embodiments, additional functionality may be available through the interface 300. This functionality may include for example, the ability to print or export an activity or a selection of activities comprising an activity type. Functionality may also be provided which allows a user to modify the activity or update a user's progress for a particular activity.

Exemplary Individual Profile

Figure 4A:
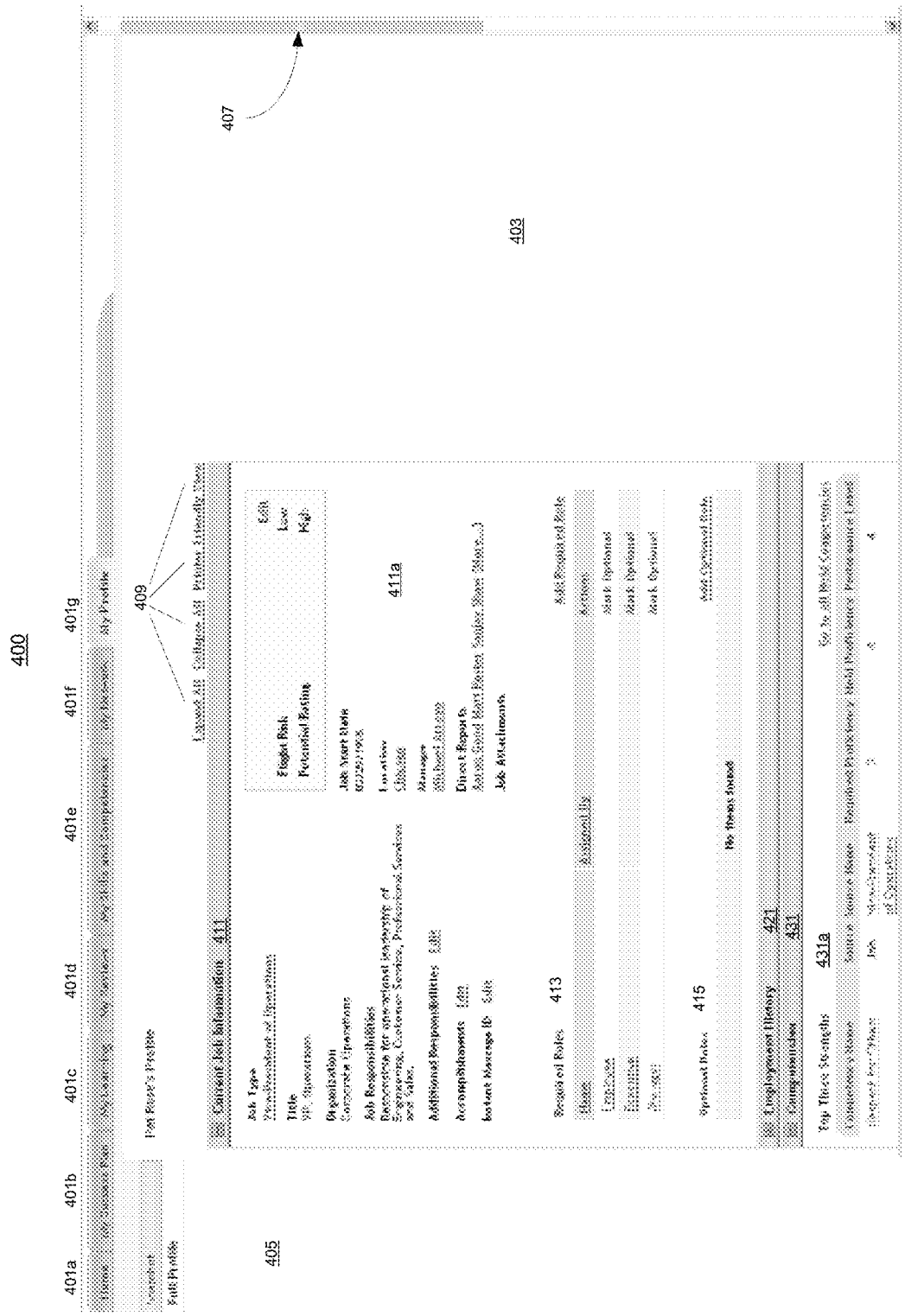
FIG. 4a depicts a graphical representation of a first portion of an exemplary on-screen display of a representation of an individual in an integrated human management application, in accordance with various embodiments.
Figure 4B:
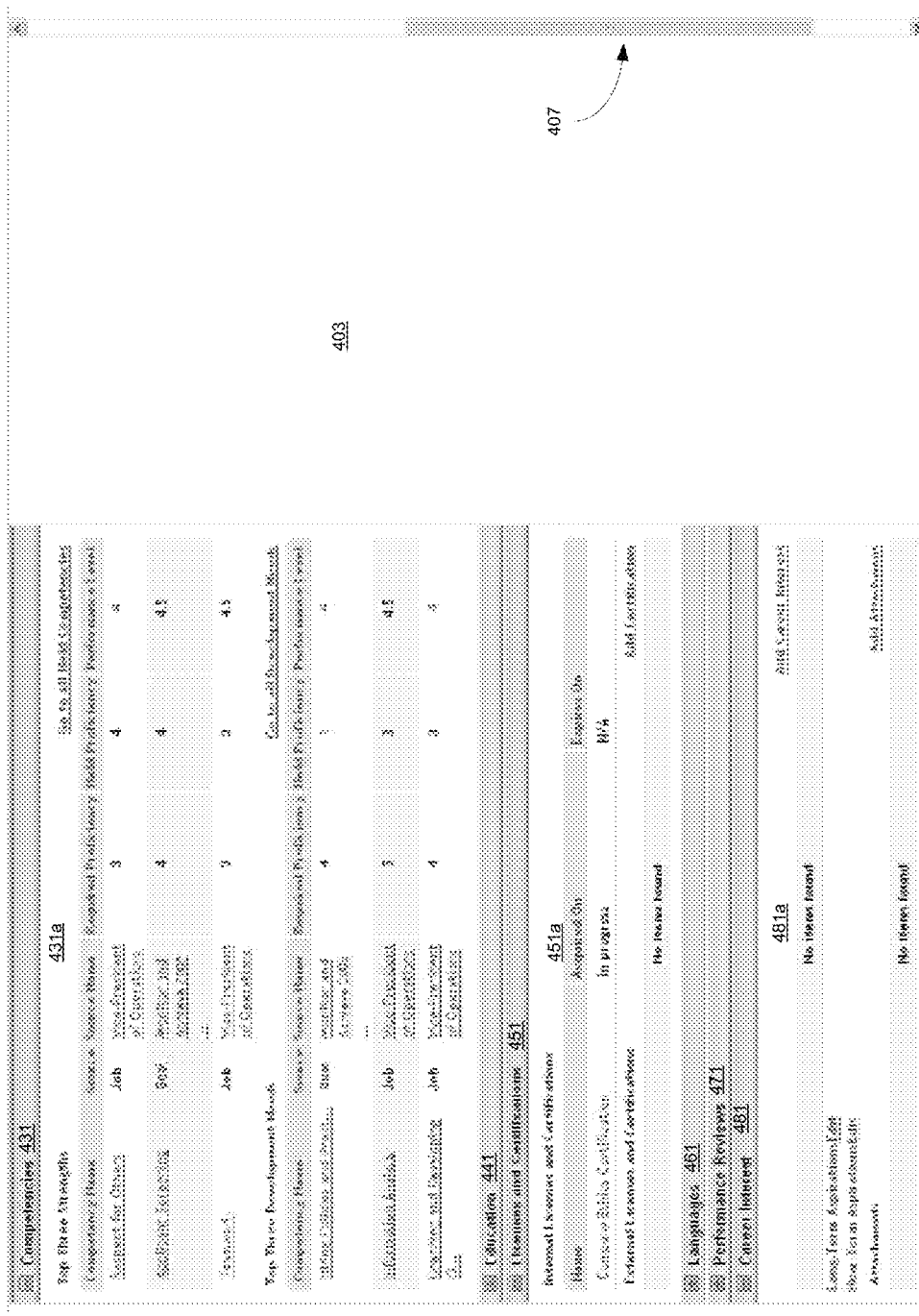
FIG. 4b depicts a graphical representation of a second portion of an exemplary on-screen display of a representation of an individual in an integrated human management application, in accordance with various embodiments.
Figure 4C:
FIG. 4c depicts a graphical representation of a third portion of an exemplary on-screen display of a representation of an individual in an integrated human management application, in accordance with various embodiments.

FIGS. 4a, 4b and 4c collectively depict graphical representations of an exemplary graphical user interface 400 representing an individual in an integrated human management application, in accordance with various embodiments. In a typical configuration, graphical user interface 400 depicts one or more interfaces (e.g., interface 403) corresponding to an individual's presence in the integrated human management system. In one embodiment, display 400 may present an interface with functionality specific to a particular aspect of an individual's presence in the integrated human management system.

For example, as shown, graphical user interface 400 depicts an interface 403 corresponding to a user's profile in the system. Other interfaces (not depicted) which may be displayed in graphical user interface 400 may include (but are not limited to) interfaces with functionality related to the user's network; the user's developed skills and/or competencies; the user's reviews, as submitted by authorized persons; the user's education or educational development goals; and the user's assigned and/or accepted development plans. In further embodiments, a central portal which may present access to each separate interface may be presented as well. In one embodiment, a user is able to navigate through the interfaces presented in graphical user interface 400 via actuation of a mechanism, such as a graphical button corresponding to the desired interface (e.g., buttons 401a, 401b, 401c, 401d, 401e, 401f and 401g).

As depicted, graphical profile interface 403 presents a user's profile. In a typical embodiment, graphical profile interface 403 may present information relevant to the individual represented by the profile in the context of human capital management. This information may include, for example, information in specific classes of data such as the individual's current position, education, employment history and skills. In one embodiment, the specific classes of data may be represented according to distinct sections in the graphical interface 403, and may further include additional information specific to the class of data within the boundaries of the section, as displayed. For example, as shown, graphical profile interface 403 includes: Current Job Information Section 411; Employment History Section 421; Competencies Section 431; Education Section 441; Licenses and Certifications Section 451; Languages Section 461; Performance Reviews Section 471; Career Interest Section 481; Potential Positions Section 491; Relocation Preferences Section 493; and Custom Sections 495, 497 and 499.

In one embodiment, each section may be expanded to display a sub-section providing specific detailed information corresponding to the class of data. In such embodiments, a section which is expanded to display a sub-section of detailed information may be collapsed, such that the sub-section is no longer visible. In addition, alternate presentations of the content displayed in graphical user interface 400 may be viewed. According to these embodiments, such functionality may be executed via actuating an area of the user interface (e.g., action link 409). According to some embodiments, recent modifications to the content displayed in a section may be clearly distinguished, via visual indicia, for example. In one embodiment, modifications within a pre-set threshold of time (e.g., 30 days) may be visibly distinguished as new or modified items. By visibly distinguishing new and/or modified items, a plurality of users are able to view a shared profile or development plan and provided notice that the specific piece of information has been recently modified.

Current Job Information Section 411 displays the class of information regarding the current position or role in a business or organization of the individual represented by the profile displayed in graphical user interface 400. As shown, Current Job Information Section 411 has been expanded to display subsection 411a, which presents the details of the individual's current job or position. Employment History Section 421 displays the class of information corresponding to the individual's employment history. Competencies Section 431 displays the class of information corresponding to the individual's evaluated strengths or qualities. As shown, Competencies Section 431 has been expanded to display subsection 431a, which presents the details of the individual's identified proficiency qualities and needs. Education Section 441 displays the class of information corresponding to the individual's educational history.

Licenses and Certifications Section 451 contains the class of information corresponding to any licenses and certifications relevant to the user. As shown, Licenses and Certification Section 451 has been expanded to display subsection 451a, which lists the specific licenses and certifications the user has acquired, is in progress to acquire, and/or plans to acquire. Languages Section 461 and Performance Reviews Section 471 display, respectively, the classes of information corresponding to the individual's proficiency in languages, and evaluations of the individual's performance in previous endeavors. Career Interest Section 481 displays the class of information corresponding to aspirations attributable to the user.

As shown, Career Interest Section 481 has been expanded to display subsection 481a, which distinguishes, and displays, the long-term aspirations of the user and the short-term aspirations of the user. Potential Positions Section 491 and Relocation Preferences Section 493 display, respectively, the classes of information corresponding to the individual's candidacy for other positions in the organization or business, and the user's known preferences for relocation. Custom Sections 495, 497 and 499 may be customized by the represented by the profile or other authorized users to contain and display additional classes of information corresponding to the user.

As depicted, graphical interface 403 of FIG. 4a includes a taskbar 405. In one embodiment, taskbar 405 presents additional functionality available within the sub-interface 403. In further embodiments, interface 403 also includes a scroll bar 407, for vertically navigating interface 403. In alternate embodiments, scroll bar 407 may be instantiated when interface 403, as formatted to display on user's screen, exceeds the vertical dimensions of the user's screen, and be not visible otherwise.

Basic Computing Device

Figure 5:
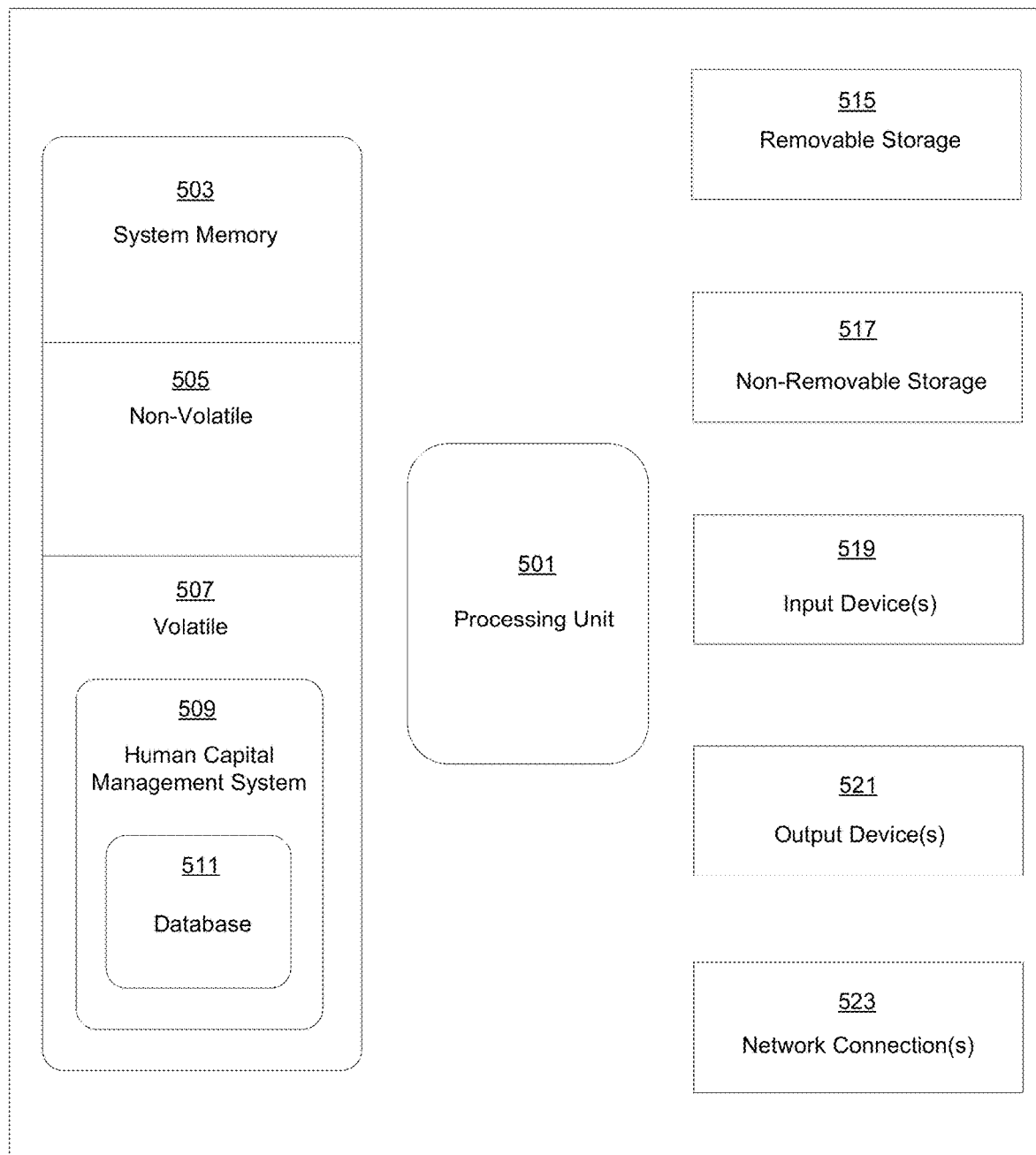
FIG. 5 depicts a block diagram of a basic computing system, in accordance with various embodiments.

FIG. 5 shows a block diagram of a basic computing system 500 that can server serve as a platform for operation according to various embodiments. Computing device 500 depicts the components of a basic computer system providing the execution platform for certain software-based functionality in accordance with various embodiments.

Computing device 500 typically includes at least some form of computer readable media. Computer readable media can be a number of different types of available media that can be accessed by computing device 500 and can include, but is not limited to, computer storage media.

In its most basic configuration, computing device 500 typically includes processing unit 501 and memory 503. Depending on the exact configuration and type of computing device 500 that is used, memory 503 can be non-volatile 505 (such as ROM, flash memory, etc.), volatile (such as RAM 507), or some combination of the two. In one embodiment, human capital management system 509 is instantiated in the volatile memory 507. The human capital management system 509 may include, for example, a database 511 for the storage of data related to human management which may include, for example, user profiles, development plans and/or conditional requirements. Similarly, human capital management system 509 and database 511 may also be implemented, in whole or in part, in non-volatile memory 505.

Additionally, computing device 500 can include mass storage systems (removable 515 and/or non-removable 517) such as magnetic or optical disks or tape. Accordingly, human capital management system 509 and database 511 may also be stored in, and instantiated from both removable 515 and non-removable 517 mass storage systems. Similarly, computing device 500 can include input devices 519 and/or output devices 521 (e.g., such as a display). Additionally, computing device 500 can include network connections 523, such as a network interface connection (NIC) to other devices, computers, networks, servers, etc. using either wired or wireless media. As all of these devices are well known in the art, they need not be discussed in detail.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for managing human capital, the method comprising:
   displaying, in a first graphical user interface executing in a first computing device, a pre-defined list of conditions corresponding to a developmental need;
   defining a plurality of developmental needs from a user selection in said first graphical user interface of at least one condition from said pre-defined list of conditions;
   consolidating said plurality of developmental needs into a development plan;
   assigning said development plan to a first user associated with a role, said development plan comprising an instance of said development plan template;
   displaying via said first graphical user interface a graphical bar representing a status in terms of percentage of completion of a developmental need, a name of said developmental need, a due date of said developmental need, an assignor of said developmental need, a name of a plan affiliated with said developmental need, and a graphical toggle operable to toggle said first graphical user interface between displaying currently pending developmental needs and displaying completed developmental needs;
   customizing said development plan for said first user by displaying said development plan and granting access to said development plan to a second user via a second graphical user interface executing in a second computing device, said second computing device being located remotely from said first graphical user interface, and modifying said development plan for said first user based on input received from said second user; and
   displaying in a third graphical user interface a profile of the first user comprising a career interest section;
   wherein said modification is automatically propagated in both said first and said second graphical user interfaces,
   wherein said development plan comprises one of a plurality of development plans comprising a plurality of developmental needs for a plurality of users,
   further wherein a progress of the plurality of users in completing the plurality of development plans is displayed to the second user in a single display of the second graphical user interface.

2. The method of claim 1, wherein said defining said plurality of developmental needs comprises:
   setting a plurality of target dates by which said at least one condition is to be performed by said user to satisfy said plurality of developmental needs; and
   tracking a progress of said first user in executing said development plan.

3. The method of claim 1, further comprising assigning a priority of a developmental need relative to other developmental needs corresponding to the development plan.

4. The method of claim 1, wherein said second user is authorized to access said development plan.

5. The method of claim 4, wherein said granting access comprises allowing a viewing of said progress of said first user in completing said development plan.

6. The method of claim 4, wherein said granting access comprises:
   receiving user input from said second user corresponding to a selection of a new developmental need; and
   integrating said new developmental need into said development plan.

7. The method of claim 1, wherein said development plan is customized for said first user from a plurality of pre-defined development plans.

8. The method of claim 1, wherein said assigning said development plan to said first user comprises creating an association between said first user and said development plan in said integrated software application.

9. The method of claim 8, wherein said assigning said development plan to said first user further comprises:
   receiving a user input from a second user of said integrated software application, said user input corresponding to assigning said development plan to said first user.

10. The method of claim 1, further comprising storing said development plan as a development plan template in a storage base, said development plan template corresponding to a role.

11. The method of claim 1, wherein said consolidating said plurality of user-defined developmental needs into a development plan is initiated based on user input provided by said second user.

12. The method of claim 1, further comprising:
    combining said development plan with a second development plan to form a compound development plan.

13. The method of claim 1, further comprising:
    combining said development plan with a second development plan such that said second development plan becomes a conditional requirement of said development plan.

14. A computer-implemented method for managing human capital in a system, said method comprising:

creating a plurality of development plans comprising a plurality of user-defined conditional requirements, the plurality of user-defined conditional requirements being selected by a user from a set of pre-defined conditional requirements;

storing said plurality of development plans as a plurality of development plan templates;

assigning said plurality of development plans to a plurality of entities, said assigning performed by a managing user of said system;

customizing said plurality of development plan for said plurality of entities by displaying and granting access to said development plan to a managing user remote from said first user in a first graphical user interface, and modifying said development plan for said plurality of entities based on input received from said managing user in said first graphical user interface;

setting a plurality of target dates corresponding to said plurality of user-defined conditional requirements comprised in said plurality of development plans for said plurality of entities; and monitoring a plurality of progresses of said plurality of development plans in a single display of said first graphical user interface;

wherein said modification is automatically propagated and visibly distinguished in a second graphical user interface accessible to said first user, displaying via said second graphical user interface a graphical bar representing a status in terms of percentage of completion of a user-defined conditional requirement of said plurality of user-defined conditional requirements, a name of said user-defined conditional requirement, a due date of said user-defined conditional requirement, an assignor of said user-defined conditional requirement, a name of a plan affiliated with said user-defined conditional requirement, and a graphical toggle operable to toggle said second graphical user interface between displaying currently pending user-defined conditional requirements and displaying completed user-defined conditional requirements; and displaying via a third graphical user interface a profile of the first user comprising a relocation preferences section;

further wherein said creating, said storing, said assigning, said customizing, said setting and said monitoring are performed in by integrated human capital management system executing computer-readable instructions on a computer system.

15. The method of claim 14, wherein creating said plurality of development plans comprises:

defining a plurality of conditional requirements from received user input to comprise said plurality of development plans; and associating said plurality of conditional requirements to said plurality of development plans.

16. The method of claim 14, further comprising:

modifying a development plan for an entity, said modifying comprising modifying a plurality of conditional requirements comprising said development plan for said entity.

17. The method of claim 16, wherein said modifying comprises de-assigning a development plan to an entity when said development plan is completed by said entity.

18. The method of claim 14, wherein said assigning of said plurality of development plans is performed automatically.

19. A re-writable non-transitory computer-readable medium comprising program instructions that, when executed on a computer system, is operable to implement a method of managing human capital, said program instructions comprising:

instructions to display, in a first graphical user interface executing in a first computing device, a pre-defined list of conditions corresponding to a developmental need;

instructions to define a plurality of developmental needs from a user selection in said first graphical user interface of at least one condition from said pre-defined list of conditions;

instructions to consolidate said plurality of developmental needs into a development plan template corresponding to a role;

instructions to store said development plan as a development plan template in a storage base, said development plan template corresponding to said role;

instructions to assign said development plan to a first user associated with said role;

instructions to display via said first graphical user interface a graphical bar representing a status in terms of percentage of completion of a developmental need, a name of said developmental need, a due date of said developmental need, an assignor of said developmental need, a name of a plan affiliated with said developmental need, and a graphical toggle operable to toggle said first graphical user interface between displaying currently pending developmental needs and displaying completed developmental needs;

instructions to customize said development plan for said first user by displaying said development plan and granting access to said development plan to a second user via a second graphical user interface executing in a second computing device, said second computing device being located remotely from said first graphical user interface, and to modify said development plan for said plurality of entities based on input received from said second user;

instructions to track a progress of said first user in executing said development plan, and instructions to display via a third graphical user interface a profile of the first user comprising a licenses and certifications section;

wherein said modification is automatically propagated in both said first and said second graphical user interfaces, wherein said development plan comprises one of a plurality of development plans comprising a plurality of developmental needs for a plurality of users, further wherein a progress of the plurality of users in completing the plurality of development plans is displayed to the second user in a single display of the second graphical user interface.

20. The computer-readable medium of claim 19, wherein said program instructions further comprise:

instructions to modify a user-defined developmental need comprised in said development plan saved to said first user.

21. The computer-readable medium of claim 19, wherein a user-defined developmental need of said plurality of development needs comprises:

a plurality of target dates corresponding to said plurality of conditions to be achieved.

22. The computer-readable medium of claim 19, wherein said program instructions further comprise:

instructions to access a remotely distributed instance of said human capital management system.

23. The computer-readable medium of claim 22, wherein said instructions to access a remotely distributed instance of said human capital comprises instructions to access data corresponding to said first user comprised in storage in a computing environment executing said distributed instance.

\* \* \* \* \*